(12) United States Patent
Xu et al.

(10) Patent No.: US 9,346,109 B2
(45) Date of Patent: May 24, 2016

(54) UNEQUAL HELIX-ANGLE END MILL

(75) Inventors: Jin Xu, Zhuzhou (CN); Shuzhang Fang, Zhuzhou (CN); Shequan Wang, Zhuzhou (CN); Ping Li, Zhuzhou (CN)

(73) Assignee: ZHUZHOU CEMENTED CARBIDE CUTTIG TOOLS CO., LTD., Zhuzhou, Hunan (CN)

( * ) Notice: Subject to any disclaimer, the term of this patent is extended or adjusted under 35 U.S.C. 154(b) by 215 days.

(21) Appl. No.: 13/821,990

(22) PCT Filed: Apr. 28, 2011

(86) PCT No.: PCT/CN2011/073412
§ 371 (c)(1),
(2), (4) Date: Mar. 10, 2013

(87) PCT Pub. No.: WO2012/071847
PCT Pub. Date: Jun. 7, 2012

(65) Prior Publication Data
US 2013/0170916 A1 Jul. 4, 2013

(30) Foreign Application Priority Data
Nov. 30, 2010 (CN) .......................... 2010 1 0565807

(51) Int. Cl.
*B23C 5/10* (2006.01)
(52) U.S. Cl.
CPC ........... *B23C 5/10* (2013.01); *B23C 2210/0492* (2013.01); *B23C 2210/203* (2013.01); *B23C 2210/282* (2013.01); *Y10T 407/1948* (2015.01)
(58) Field of Classification Search
CPC .................... B23C 5/10; B23C 2210/0492
USPC ....................................................... 407/53, 54
See application file for complete search history.

(56) References Cited

U.S. PATENT DOCUMENTS

| | | | | |
|---|---|---|---|---|
| 4,963,059 | A * | 10/1990 | Hiyama | 407/60 |
| 5,049,009 | A * | 9/1991 | Beck et al. | 407/54 |
| 5,188,488 | A * | 2/1993 | Nakayama et al. | 407/54 |
| 7,367,754 | B1 * | 5/2008 | Greenwood et al. | 407/63 |
| 2002/0067964 | A1 * | 6/2002 | Sekiguchi et al. | 407/63 |
| 2002/0102140 | A1 * | 8/2002 | Thomas | 407/53 |
| 2007/0154272 | A1 * | 7/2007 | Wells et al. | 407/54 |
| 2007/0201957 | A1 * | 8/2007 | Povich | 407/53 |
| 2009/0232610 | A1 * | 9/2009 | Takagi et al. | 407/54 |
| 2012/0282044 | A1 * | 11/2012 | Volokh et al. | 407/53 |

* cited by examiner

*Primary Examiner* — Sunil K Singh
*Assistant Examiner* — Alan Snyder
(74) *Attorney, Agent, or Firm* — Raymond Y. Chan; David and Raymond Patent Firm

(57) ABSTRACT

An unequal helix-angle end mill includes a cutting part and a handle part. The cutting part is provided with a plurality of flutes, each spirally extending from the bottom end to the handle part. The face of each flute facing the cutting rotation direction is a rake face, wherein the rake face and an outer peripheral face of the cutting part are intersected to form an outer peripheral blade, and the helix-angle of at least one of the peripheral blades is different from those of the other peripheral blades. A face joined with the peripheral blade among the outer peripheral face of the cutting part is a rear face. The width B of the edge flap of each peripheral blade is equal on a plane orthogonal to a rotating axis of the end mill. The unequal helix-angle end mill has high strength, and enhances the cutting depth and durability.

12 Claims, 5 Drawing Sheets

UNEQUAL HELIX-ANGLE END MILL

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to the metal cutting and processing field, and more particularly to an unequal helix-angle end mill.

2. Description of Related Arts

A milling process is a discontinuous processing procedure. An end mill will suffer from an impact load due to the milling movement between the end mill and the material processed during the milling operation, and thus an oscillation of the end mill is results. When the oscillation frequency of the end mill is approximately equal to the natural frequency of the work piece, a resonance vibration takes place and the processing quality and the life span of the end mill is severely affected. Currently many efforts have been devoted in the improvement of the anti-vibration end mill in the aim of reducing or eliminating the oscillation of the end mill during the milling operation, enhancing the processing equality, and increasing the life span of the end mill. The document CN101530930 discloses an unequal helix-angle end mill which is provided with a plurality of helical winding peripheral blades. The helix-angle of each of the peripheral blades is different from the helix-angles of other peripheral blades, so that the milling time interval of the peripheral blades toward the rotation direction of the end mill is not equal, the time interval for each of the peripheral blades that cuts into the work piece is not equal, the included angle between each of the peripheral blades is different, and the effective cutting length from the bottom peripheral blade to the handle part is different. Thus the main body of the end mill is prevented from producing periodic oscillation of the same frequency as the natural frequency of the work piece, and the resonance vibration is also prevented. Accordingly, the surface quality of the work piece is enhanced, and the excessive abrasion or even breakage of the blades of the end mill is prevented. However, in such unequal helix-angle end mills, the width of the edge flap of each of the cutting blades along the axial direction is not the same, and thus the strength thereof is different, so that there must be a relatively weak site. The linear portion of the flute is intersected with the rear face at an obtuse angle, the width of the edge flap of the cutting blade at the rear side of the rotation direction of the end mill is narrowed down, and thus the strength and rigidity of the cutting blades of the end mill become weak. Therefore, when this type of end mill is used in a milling process of axial roughing feed or deep sawing, the possibility of the breakage of the cutting blades is relatively high.

SUMMARY OF THE PRESENT INVENTION

The technical problem to be solved by the present invention is to overcome the disadvantages of the conventional art and provide an unequal helix-angle end mill which has high strength, enhanced cutting depth, and durability.

Additional advantages and features of the invention will become apparent from the description which follows, and may be realized by means of the instrumentalities and combinations particular point out in the appended claims.

According to the present invention, the foregoing and other objects and advantages are attained by an unequal helix-angle end mill comprising a cutting part and a handle part, wherein the entire cutting part is provided with a plurality of flutes, wherein each of the flutes spirally extends from a bottom end of the cutting part to the handle part, wherein a face of each flute facing a cutting rotation direction is a rake face, wherein the rake face and an outer peripheral face of the cutting part are intersected to form an outer peripheral blade, wherein a helix-angle of at least one of the peripheral blades is different from those of the other peripheral blades, wherein a face joined with the peripheral blade among the outer peripheral face of the cutting part is a rear face, wherein the width B of an edge flap of each of the peripheral blades is equal on a plane orthogonal to a rotating axis of the end mill.

The width B of the edge flap of each of the peripheral blades is constant along an axial direction of the end mill.

The outer diameter of the cutting part is D, and the width B of the edge flap of each of the peripheral blades is 0.16D~0.25D.

The length Ap of each of the peripheral blades is 2.5D~5D.

The rear face comprises a first rear face, a second rear face, and a third rear face.

In comparison with the conventional art, the present invention has the following advantages:

The width B of an edge flap of each peripheral blade is equal on a plane orthogonal to the rotating axis of the end mill of the present invention, so that the difference between the strength of each peripheral blade is reduced. Thus the end mill of the present invention not only can improve the surface quality of the work piece by inhibiting the vibration during the cutting process, but also can ensure the entire strength and rigidity of the peripheral blades of the end mill as well as enhance the durability and cutting efficiency of the end mill, so as to provide advantageous conditions to the process for roughing feed and deep sawing. The width B of the edge flap of each peripheral blade is constant along the axial direction of the end mill, so that the strength of each peripheral blade is substantially constant along the axial direction of the end mill so as to further enhance the equability of the strength of the peripheral blades, avoid the existence of several weak sites on the peripheral blades on a predetermined sectional plane orthogonal to the rotating axis, prevent relatively fast abrasion which takes place in a part of the end mill that results in a decrease of the durability of the end mill, and further enhance the excellent performance of the end mill of the present invention in a process of roughing feed and deep sawing. Since the entire strength of the peripheral blades is enhanced, the length Ap of each peripheral blade can be increased to 2.5 to 5 times of the outer diameter D of the cutting part, so as to obtain higher cutting efficiency and durability. The rear face comprises a first rear face, a second rear face, and a third rear face. The three rear faces are all prepared through plane grinding with cutting clearances, so that the rigidity and strength of each cutting blade of the end mill are ensured, and the processing in the actual production is easy.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
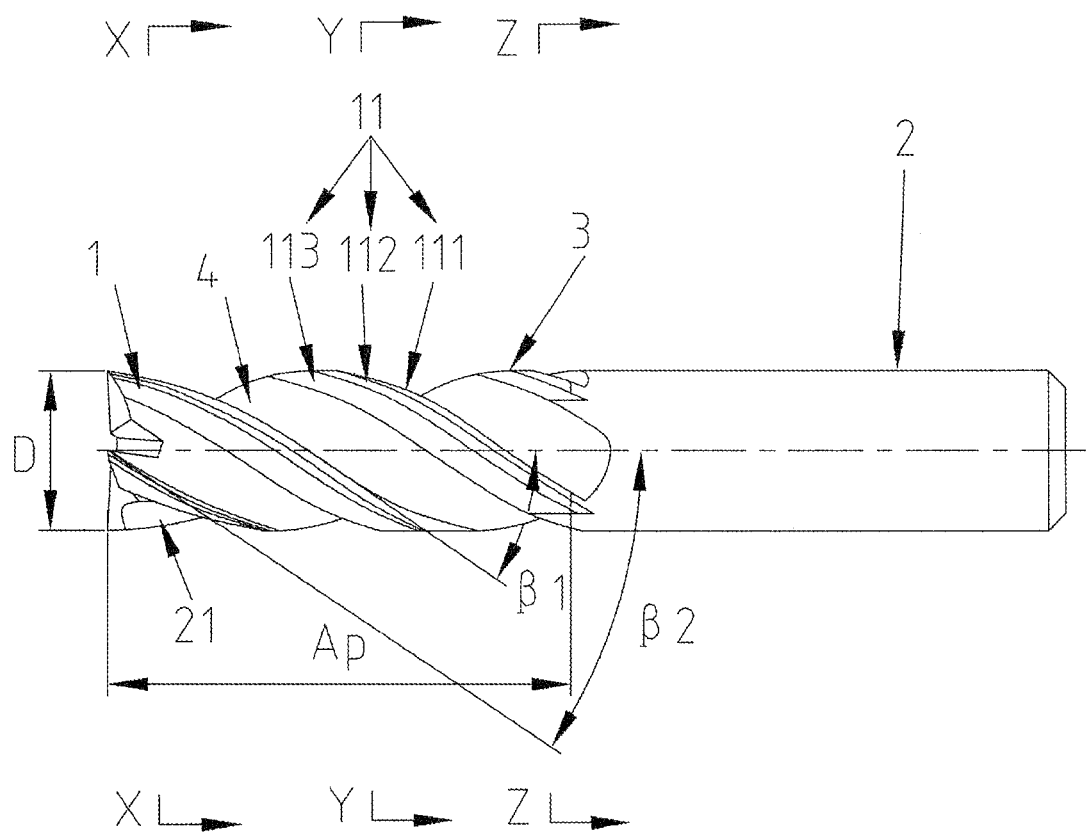
FIG. 1 is a lateral view of the unequal helix-angled end mill according to a preferred embodiment of the present invention.
Figure 2:
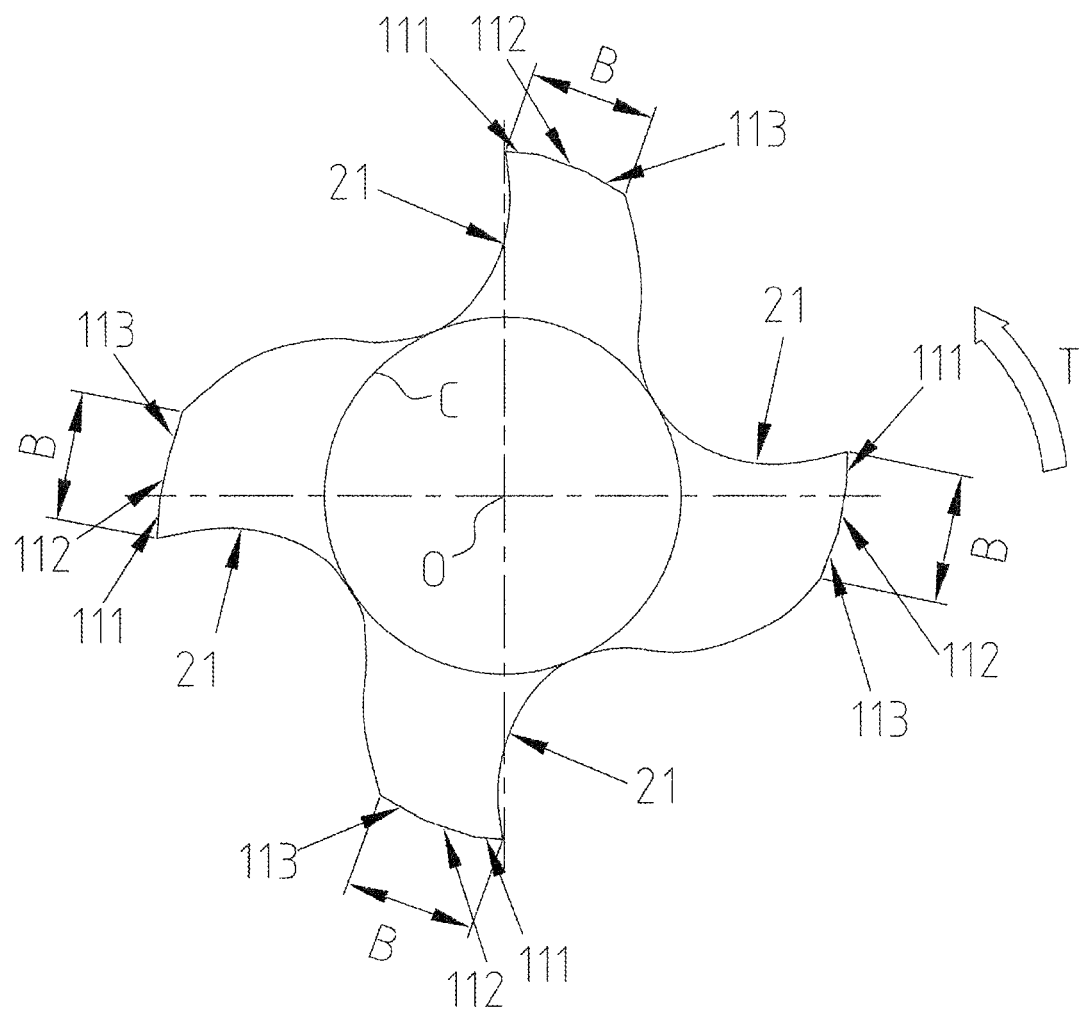
FIG. 2 is an enlarged sectional view along X-X line in FIG. 1.
Figure 3:
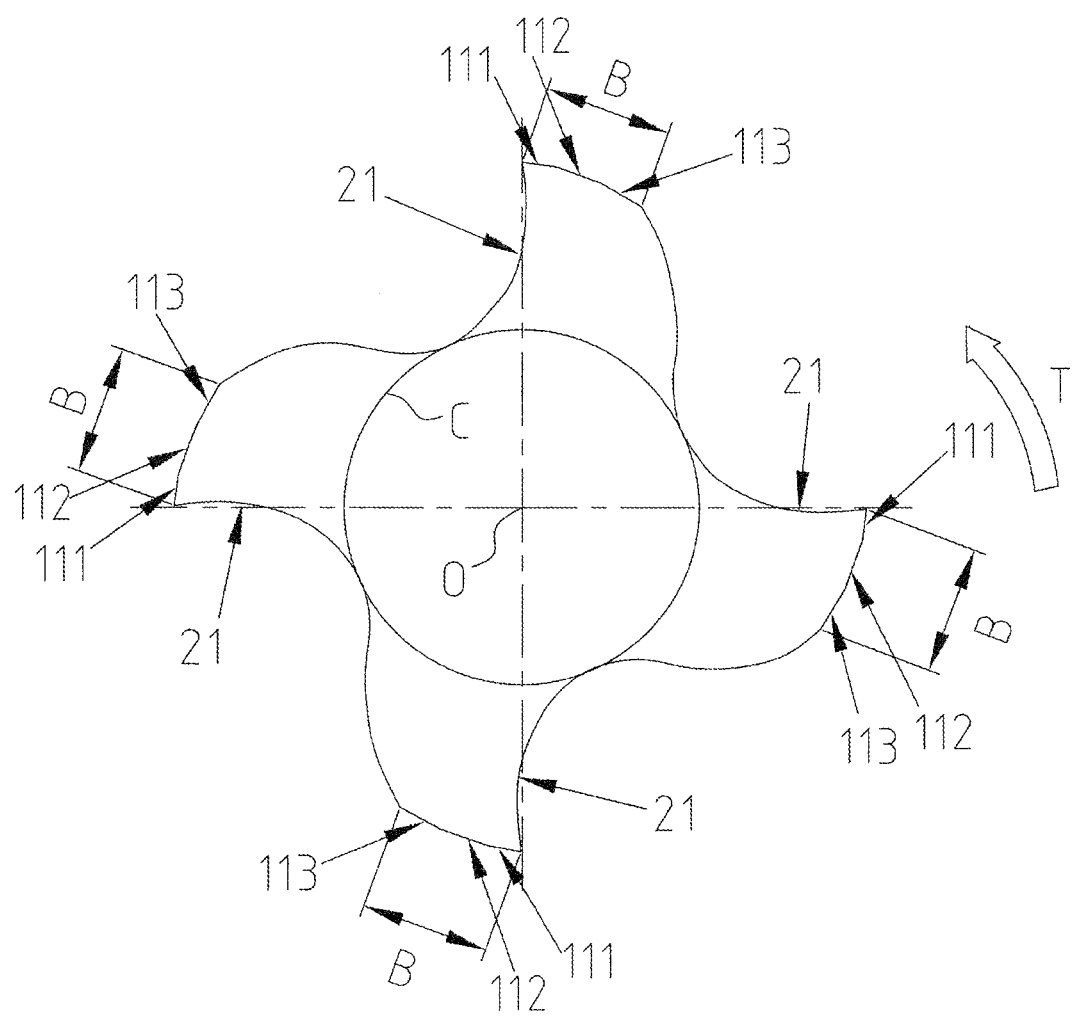
FIG. 3 is an enlarged sectional view along Y-Y line in FIG. 1.
Figure 4:
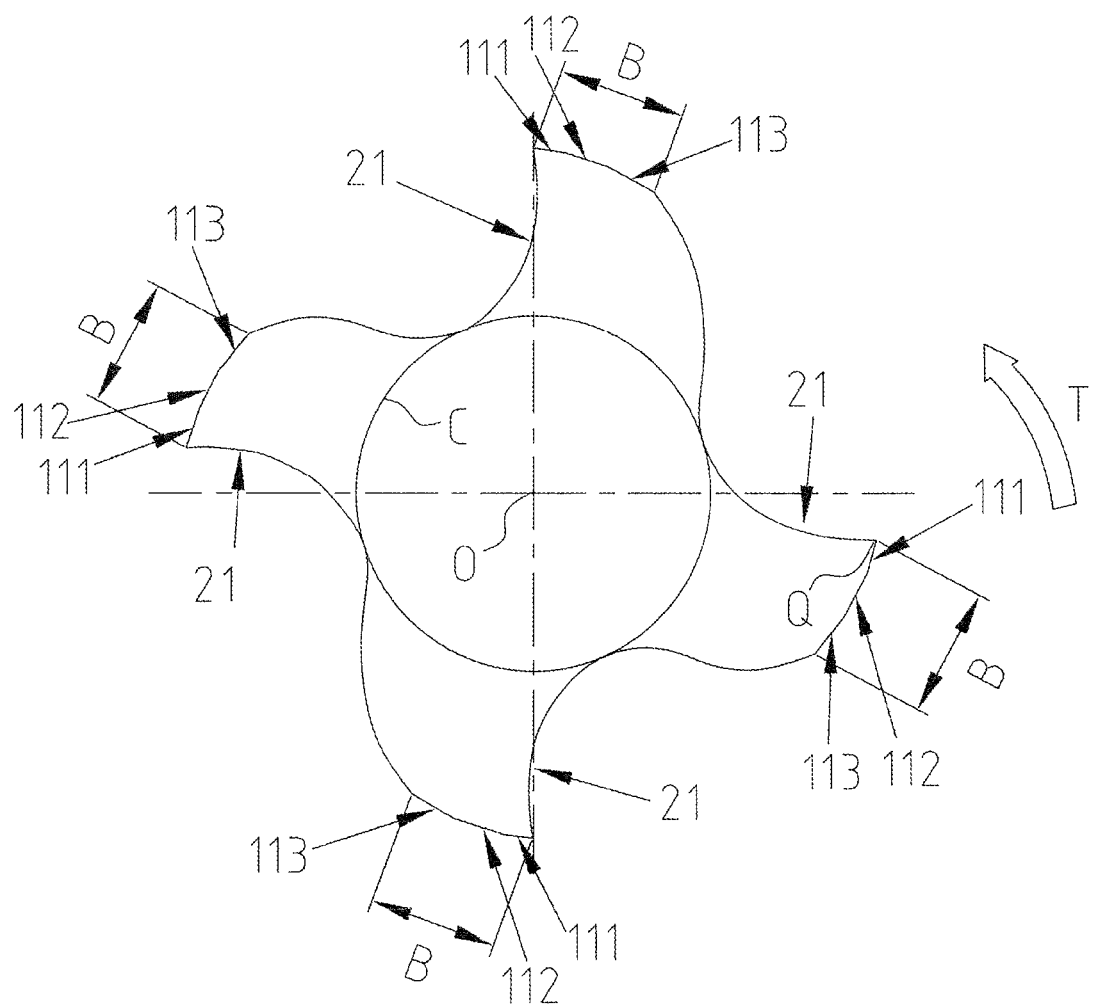
FIG. 4 is an enlarged sectional view along Z-Z line in FIG. 1.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 through 4 of the drawings, an unequal helix-angle end mill according to a preferred embodiment of the present invention is illustrated. The unequal helix-angle end mill, which is made of rigid material such as cemented carbide and whose whole body of which is formed in a column shape, comprises a handle part 2, which is column-shaped, at a first end thereof, and a cutting part 1 at a second end thereof. The handle part 2 is used for coupling with a main spindle of a machine tool. The main spindle of the machine tool can drive the end mill to rotate in T direction with respect to the central axis thereof so as to mill the work piece. The entire cutting part 1 is provided with a plurality of flutes 4, each of which spirally extends from a bottom end of the cutting part 1 to the handle part 2. According to this preferred embodiment of the present invention, the number of the flutes 4 is four. The four flutes 4 have different pitches along the circumferential direction of the unequal helix-angle end mill. A face of each flute 4 facing the cutting rotation direction is a rake face 21, the rake face 21 and an outer peripheral face of the cutting part 1 intersect to form an outer peripheral blade 3, and the helix-angle of at least one of the peripheral blades 3 is different from those of the other peripheral blades 3. According to this preferred embodiment, one pair of the peripheral blades 3 defines a helix angle β1 of 38°, and the other pair of the peripheral blades 3 defines a helix angle β2 of 41°. A face joined with the peripheral blade 3 among the outer peripheral face of the cutting part 1 is a rear face 11. The rear face 11 comprises a first rear face 111, a second rear face 112, and a third rear face 113. The three rear faces are all prepared through plane grinding with cutting clearances, so that the rigidity and strength of each cutting blade of the end mill is ensured, and the processing in the actual production is easy. The width B of the edge flap of each peripheral blade 3 is equal on a plane orthogonal to the rotating axis of the unequal helix-angle end mill, so that the difference between the strength of each peripheral blade 3 is reduced. The unequal helix-angle end mill of the present invention not only can improve the surface quality of the work piece by inhibiting the vibration during the cutting process, but also can ensure the entire strength and rigidity of the peripheral blades 3 of the end mill as well as enhance the durability and cutting efficiency of the end mill, so as to provide advantageous conditions for the process of roughing feed and deep sawing.

According to this preferred embodiment, the width B of the edge flap of each peripheral blade 3 is constant along the axial direction of the unequal helix-angle end mill. Therefore, the strength of each peripheral blade 3 is substantially constant along the axial direction of the unequal helix-angle end mill so as to further enhance the equability of the strength of the peripheral blades 3, prevent the relatively fast abrasion which takes place in predetermined weak sites of the unequal helix-angle end mill that result in a decrease of the durability of the end mill, and further enhances the excellent performance of the end mill of the present invention in a process of roughing feed and deep sawing. When the outer diameter of the cutting part 1 is D, the width B of the edge flap of each peripheral blade 3 is 0.16D~0.25D. According to this preferred embodiment, the width B of the edge flap is 0.163D. The width Ap of each peripheral blade 3 is 2.5D~5D. According to this preferred embodiment, the width Ap of each peripheral blade is 3.5D. Since the entire strength of the peripheral blades is enhanced, the length Ap of each peripheral blade can be greatly increased, so that a higher cutting efficiency and durability of the unequal helix angle end mill of the present invention are obtained. The present invention not only can be used in the orthogonal end mill of this preferred embodiment but also can be used in other end mills such as an end mill with a ball head or an arc head.

The following description will discuss the performance of the end mill of the present invention in comparison with a control.

Accordingly, the end mill of the present invention is compared with an ordinary end mill under the following cutting conditions.

For the control, a structure with unequal saw pitches and equal helix angles is employed. The slot-shaped scrap receiving space is relatively large and the discharge of scraps is smooth and easy. In addition, the rigidity and strength of the end mill is good.

For the cutting parameters, Vc=60 m/min, fz=0.041 mm/z, Ap=4 mm, Ae=8 mm.

The material of the work piece is stainless steel S316.

For the lifespan of the standard end mill, the abrasion or breakage of the rear face of the peripheral blades is evaluated by the VB value.

After a two-hour milling process, the abrasion or breakage conditions of the end mill of the present invention and the control are detected and the results are shown in the following description.

For the end mill of the present invention, VB=0.06, a slight breakage of the blades is detected.

For the control, VB=0.091 mm~0.098 mm, a relatively large breakage of the blades is detected.

Figure 5:
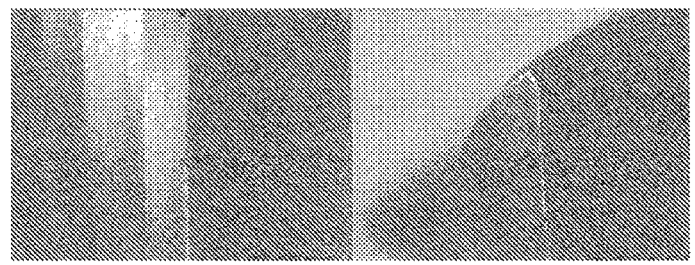
FIG. 5 is a schematic view illustrating the abrasion diagram which is enlarged by twenty times after a slot-milling process utilizing the unequal helix-angle end mill according to the above preferred embodiment of the present invention.
Figure 6:
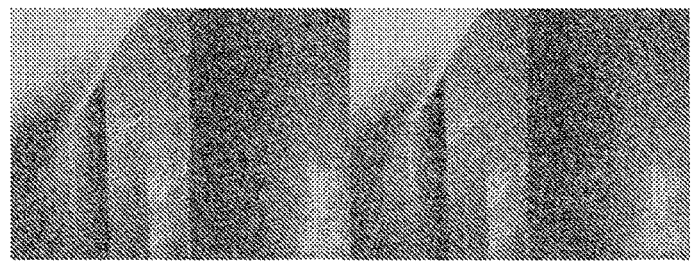
FIG. 6 is a schematic view illustrating the abrasion diagram which is enlarged by twenty times after a slot-milling process utilizing the control end mill.

FIG. 5 illustrates the abrasion diagram of the end mill of the present invention which has milled out sixty slots in the work piece which is made of stainless steel S316. FIG. 6 illustrates the abrasion diagram of the control which has milled out twenty-five slots in the work piece which is made of stainless steel S316. It thus can be seen that there is rarely an abrasion on the rear face 11 of the end mill of the present invention, and just a slight breakage of the blades is detected, so that the durability of the end mill of the present invention is significantly higher than the control.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An unequal helix-angle end mill comprising a cutting part and a handle part, wherein said cutting part has a column shape and defines an outer peripheral face, wherein said entire cutting part is provided with a plurality of flutes which have different pitches along a circumferential direction, wherein each of said flutes spirally extends from a bottom end of said cutting part to said handle part, wherein a face of each flute facing a cutting rotation direction is a rake face, wherein said rake face and said outer peripheral face of said cutting part are intersected to form an outer peripheral blade, wherein a helix-angle of at least one of said peripheral blades is different from those of the other peripheral blades, wherein a face joined with said peripheral blade among said outer peripheral face of said cutting part is a rear face, wherein the width B of an edge flap of each of said peripheral blades is equal on a plane orthogonal to a rotating axis of said end mill, wherein the width B of said edge flap of each of said peripheral blades is constant along an axial direction of said end mill, so that a strength of each peripheral blade is substantially constant along said axial direction of said end mill to further enhance an equability of the strength of said peripheral blades, avoid an existence of several weak sites on said peripheral blades on a predetermined sectional plane orthogonal to said rotating axis, prevent relatively fast abrasion which takes place in a part of said end mill that results in a decrease of a durability of said end mill, and further enhance a performance of said end mill in a process of roughing feed and deep sawing.

2. The unequal helix-angle end mill, as recited in claim 1, wherein the width B of said edge flap of each of said peripheral blades is constant along an axial direction of said end mill at any cross section thereof.

3. The unequal helix-angle end mill, as recited in claim 1, wherein the outer diameter of said cutting part is D, wherein the width B of said edge flap of each of said peripheral blades is 0.16D-0.25D.

4. The unequal helix-angle end mill, as recited in claim 1, wherein the outer diameter of said cutting part is D, wherein the length Ap of each of said peripheral blades is 3.5D-5D.

5. The unequal helix-angle end mill, as recited in claim 3, wherein the length Ap of each of said peripheral blades is 3.5D-5D.

6. The unequal helix-angle end mill, as recited in claim 1, wherein said rear face comprises a first rear face, a second rear face, and a third rear face which are three plane grinding surfaces respectively.

7. The unequal helix-angle end mill, as recited in claim 5, wherein said rear face comprises a first rear face, a second rear face, and a third rear face which are three plane grinding surfaces respectively.

8. The unequal helix-angle end mill, as recited in claim 2, wherein the outer diameter of said cutting part is D, wherein the width B of said edge flap of each of said peripheral blades is 0.16D-0.25D.

9. The unequal helix-angle end mill, as recited in claim 2, wherein the outer diameter of said cutting part is D, wherein the length Ap of each of said peripheral blades is 3.5D-5D.

10. The unequal helix-angle end mill, as recited in claim 8, wherein the length Ap of each of said peripheral blades is 3.5D-5D.

11. The unequal helix-angle end mill, as recited in claim 2, wherein said rear face comprises a first rear face, a second rear face, and a third rear face which are three plane grinding surfaces respectively.

12. The unequal helix-angle end mill, as recited in claim 10, wherein said rear face comprises a first rear face, a second rear face, and a third rear face which are three plane grinding surfaces respectively.

* * * * *